J. SCHEIDEMAN.
REFRIGERATING APPARATUS.
APPLICATION FILED MAR. 2, 1908.
902,256.
Patented Oct. 27, 1908.
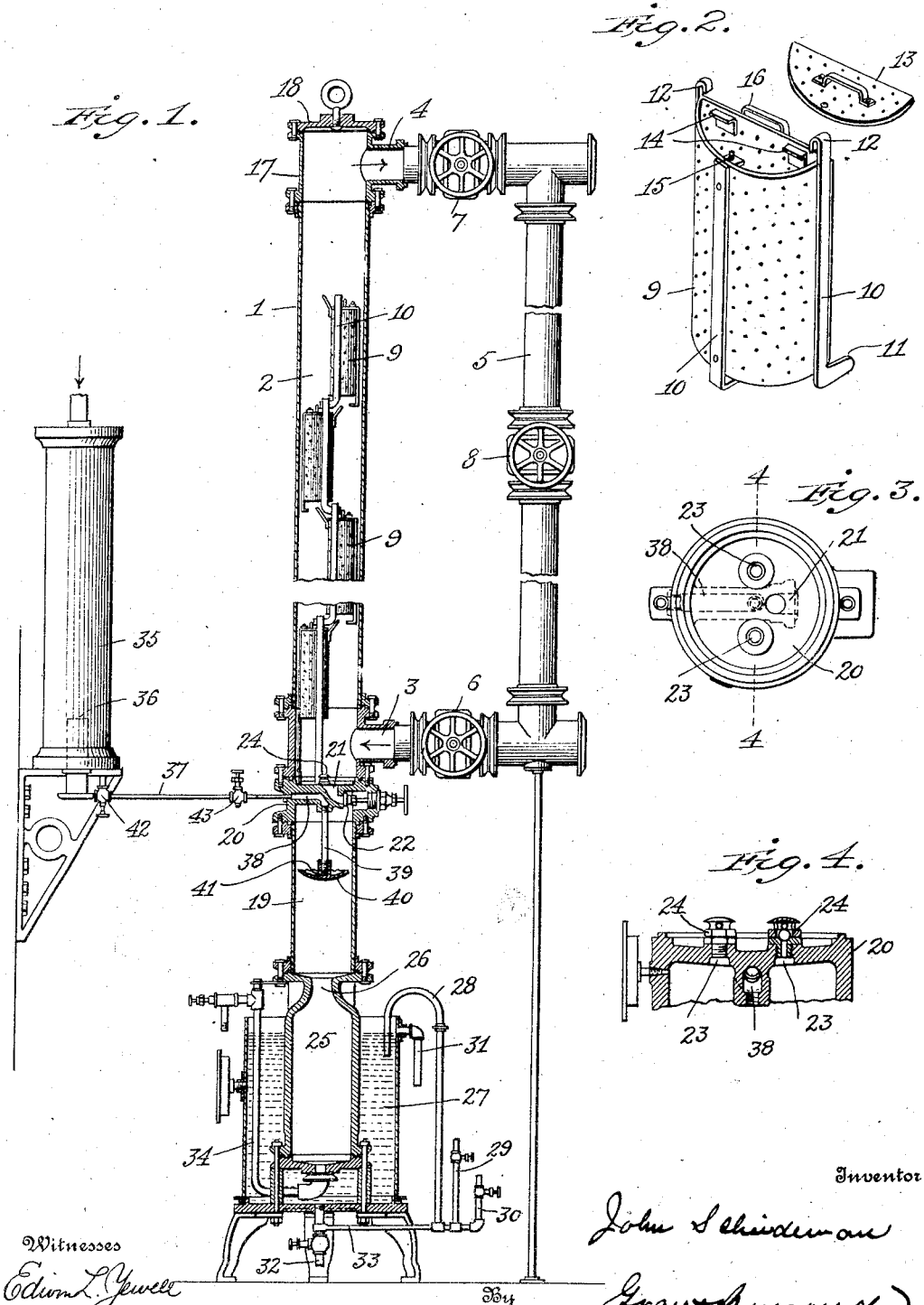

UNITED STATES PATENT OFFICE.

JOHN SCHEIDEMAN, OF WASHINGTON, DISTRICT OF COLUMBIA.

REFRIGERATING APPARATUS.

No. 902,256.  Specification of Letters Patent.  Patented Oct. 27, 1908.

Application filed March 2, 1908. Serial No. 418,707.

*To all whom it may concern:*

Be it known that I, JOHN SCHEIDEMAN, a citizen of the United States, and resident of Washington, in the District of Columbia, have invented certain new and useful Improvements in Refrigerating Apparatus, of which the following is a full, clear, and exact description, such as will enable those skilled in the art to which it appertains to make and use the same, reference being had to the accompanying drawings, forming part of this specification.

The invention relates to improvements in refrigerating and ice making plants which employ as a refrigerating agent a substance that has the property of becoming liquefied when subjected to the action of pressure and cold and which passes into the form of gas when the pressure is removed. In such plants the refrigerating agent becomes contaminated with foreign substance, which interferes with the efficiency of the plant. As ammonia is the substance generally used as the refrigerating agent, the invention will be described as being applied to a plant using such substance, although it is applicable to plants using other refrigerating agents.

Ammonia gas, when used as a refrigerating agent, becomes contaminated with foreign matter, such as moisture, lubricating oil that escapes from the compressor, weak liquor, grit and other substances.

The invention has for its object the provision of an apparatus whereby the ammonia can be freed from its impurities and the whole charge regenerated and dried without withdrawing it from the circulating system and without interfering with the continuous operation of the plant.

The invention consists in the novel construction, combination and arrangement of parts such as will be hereinafter described, pointed out in the appended claims and illustrated in the accompanying drawings.

In the drawings, in which similar reference characters designate corresponding parts, Figure 1 is a view, partly in elevation and partly in section, of an apparatus embodying the invention. Fig. 2 is a detail perspective view showing one of the cells and its cover. Fig. 3 is a plan view of the partition separating the absorption chambers from the expansion chamber. Fig. 4 is a sectional view on the line 4—4 of Fig. 3.

In the upper part of the cylindrical casing 1 is the absorption chamber 2 having at its lower end the inlet pipe 3 and at its upper end the outlet pipe 4. The inlet and outlet pipes are connected by the by-pass 5, the purpose of which will be explained further on. In the inlet and outlet pipes and the by-pass are the valves 6, 7 and 8, respectively, controlling the circulation through the absorption chamber and the by-pass.

In the absorption chamber 2 are the removable cells 9 for holding the material having an affinity for moisture, such as sodium carbonate. Each cell consists of a perforated shell semicylindrical in shape, closed at one end and open at the other. On the exterior of the shell are the longitudinal strips 10 having hooks 11 in their lower ends and sockets 12 in their upper ends. A cover 13 fits into the open end of the shell against the stops 14 and is secured in place by the screw 15. A handle 16 is provided for the shell to facilitate the handling of the cell.

When arranged in the absorbing chamber 2 the cells are placed one above the other and are staggered. They rest upon each other with the hooks of an upper cell engaging the sockets 12 of a lower cell, thereby forming a chain of cells. The lowermost cell has its strips 10 elongated beyond its bottom so as to elevate the cell above the floor of the absorption chamber. The linking together of the cells facilitates their insertion and withdrawal into and from the absorption chamber through the head 17, which is provided with a cover 18 and means for securing the latter in place. The strips 10 serve to offset the cells from the wall of the casing and their extended ends separate the adjacent cells to leave a space between them. By this arrangement of cells any gas passing through the absorption chamber is forced to take a devious course and thereby becomes thoroughly exposed to the action of the moisture absorbing material contained in the cells.

In the casing 1 immediately below the absorption chamber 2 is the expansion chamber 19. Separating the two chambers is the partition 20 immediately below the opening of the inlet pipe 3 into the absorption chamber. Through the channel 21 in the partition the two chambers communicate. This channel is controlled by the valve 22 operated by a hand-wheel on the exterior of the casing. The two chambers also communicate through the apertures 23 in the partition controlled by the check-valves 24, which operate to close the apertures from a pressure in the absorption chamber and to open them to pressure in the expansion chamber.

In the lower part of the casing 1 is the distilling chamber 25 communicating at its upper end through the throat 26 with the lower part of the expansion chamber 19. This distilling chamber is surrounded by the water-jacket 27 into the upper part of which leads the pipe 28 from the water and steam supply pipes 29 and 30 respectively. By admitting water and steam through these pipes, which are provided with suitable controlling valves, into the water-jacket the temperature of the distilling chamber can be regulated. Leading from the upper part of the water-jacket is the overflow pipe 31 and from its lower end leads the drain pipe 32 controlled by a suitable valve. The drain pipe is connected by the branch pipe 33 with the water and steam supply pipes 29 and 30. By means of the drain pipe and its connections and the supply pipes water can be circulated in the water-jacket and the latter also cleaned and emptied of its contents. From the lower part of the distilling chamber the pipe 34 leads upwardly through the water-jacket to a blow-off cock on the exterior. By means of the latter pipe the distilling chamber can be freed of its contents. The separator 35, through which the liquid ammonia flows, has leading from its lower end the egress pipe 36. The inner end of the egress pipe 36 opens into the separator at a level considerably above its bottom. While in the separator the liquid ammonia is comparatively quiescent and the heavier impurities in the same have an opportunity to settle in the lower part of the separator, where they collect below the mouth of the egress pipe 36. Means are provided for withdrawing the impurities from the separator and recovering any ammonia that may be mixed with the same.

Connected with the separator 35 at its lowest level is the pipe 37 leading to the duct 38 in the partition 20 separating the absorption and expansion chambers. This duct leads to the center of the partition and there connects with the pipe 39 extending downwardly into the expansion chamber and carrying at its lower end the distributing cup 40, into which the pipe opens through the outlets 41 in its lower end. In one end of the pipe 37 adjacent to the separator is the stop-valve 42 and in the other end adjacent to the expansion chamber is the expansion valve 43. By means of these valves the flow of impurities and liquid ammonia from the separator to the expansion chamber through the pipe 38 can be controlled.

The operation of the apparatus is as follows: Normally the valve 8 in the by-pass 5 is closed and the valves 6 and 7 in the inlet and outlet pipes 3 and 4 respectively are open so that the gas passes through the absorption chamber 2. In passing through this chamber the gas is dried. On entering the chamber from the inlet pipe 3 the gas has an opportunity to expand which causes it to deposit considerable of its moisture and other impurities. The moisture and other impurities that collect in the bottom of the absorption chamber pass through the channel 21 in the partition 20, the valve 22 being normally open, into the expansion chamber 19. The liquid ammonia and impurities that collect in the lower part of the separator 35 at intervals are permitted to flow through the pipe 37, the duct 38, and the pipe 39 into the distributing cup 40 in the expansion chamber. The liquid flowing over the edge of the cup is sprayed and much of the gas contained in the same escapes. The liquid residue and other impurities collect in the bottom of the expansion chamber and pass through the throat 26 into the distilling chamber 25. By means of the water-jacket the distilling chamber is ordinarily heated to about 100° F. On being heated in the distilling chamber the remaining gas contained in the liquid residue and impurities is driven off and it passes upwardly into the expansion chamber. The gas from the latter passes upwardly through the channel 21, or, if the latter should be closed, through the apertures 23 into the absorption chamber, where it is dried and passes from the same through the outlet pipe 4. When it is desired to clean the distilling chamber of any residue that may have accumulated in the same, by the admission of steam into the steam-jacket the temperature of the chamber is raised to about 150°. This drives off any gas that may remain in the residue and liquefies any grease that may have collected. The opening of the blow-off cock in the pipe 34 allows the pressure in the system to which the apparatus is applied to eject the residue through the said pipe.

When the system to which the apparatus is applied is operated with a wet compression, which sometimes happens, the gas in the circulating system is accompanied by an excess of moisture. Should the gas in this condition be permitted to enter the expansion and distilling chambers, the latter would become chilled and any water contained in the same would be frozen, which would put the purifier out of operation. To avoid this the channel 21 is closed by the valve 22 to prevent the entrance of the excessively moist gas into the expansion and distilling chambers. When the channel is closed the gas in the expansion chamber can pass from the latter through the apertures 23 into the absorption chamber by raising the check-valves 24. The residue can also be expelled from the distilling chamber by permitting an excess of ammonia to enter the expansion chamber 19 from the separator 35. When this is done the valve 22 is closed and the ammonia becoming heated forces the residue through the blow-off pipe. While the ammonia is being heated in this instance some of the gas will escape through the apertures 23, but the pressure will become sufficient to expel the residue. When it is desired to cut-out the purifier for the purpose of renewing the absorbing material in the cells or for any other reason, the valves 6 and 7 in the inlet and outlet pipes 3 and 4, respectively, are closed and the valve 8 in the by-pass 5 is opened. This arrangement causes the refrigerating agent to pass through the by-pass instead of through the absorption chamber.

Having thus described my invention, what I claim and desire to secure by Letters Patent is,

1. In refrigerating apparatus, an absorption chamber, a distilling chamber having independent communications with said absorption chamber, a check-valve controlling one of said communications and operating to close against pressure in the absorption chamber and to open to pressure in the distilling chamber, and an adjustable valve controlling the other communication between the chambers.

2. In refrigerating apparatus, an absorption chamber, an expansion chamber having independent communications with said absorption chamber, a check-valve controlling one of said communications and operating to close against pressure in the absorption chamber and to open to pressure in the expansion chamber, an adjustable valve controlling the other communication between the chambers, a separator communicating with said expansion chamber, means controlling the communication between the separator and the expansion chamber, and a distilling chamber communicating with said expansion chamber.

3. In refrigerating apparatus, an absorption chamber, a distilling chamber having independent communications with said absorption chamber, a check-valve controlling one of said communications and operating to close against pressure in the absorption chamber and to open to pressure in the distilling chamber, an adjustable valve controlling the other communication between the chambers, a separator communicating with said distilling chamber, and means controlling the communication between the separator and the distilling chamber.

4. In refrigerating apparatus, a casing, inlet and outlet pipes connected with said casing, a by-pass connecting said inlet and outlet pipes, valves controlling said inlet and outlet pipes and said by-pass to divert the refrigerating agent through either the casing or by-pass, an absorption chamber in said casing between the inlet and outlet pipes, an expansion chamber communicating with said absorption chamber, a separator communicating with said expansion chamber, and means for controlling the communication between said separator and said expansion chamber.

5. In refrigerating apparatus, a casing, inlet and outlet pipes connected with said casing, a by-pass connecting said inlet and outlet pipes, valves controlling said inlet and outlet pipes and said by-pass to divert the refrigerating agent through either the casing or by-pass, an absorption chamber in said casing between the inlet and outlet pipes, an expansion chamber communicating with said absorption chamber, a separator communicating with said expansion chamber, means for controlling the communication between the separator and the expansion chamber, and a distilling chamber communicating with said expansion chamber.

6. In refrigerating apparatus, a casing, inlet and outlet pipes connected with said casing, a by-pass connecting said inlet and outlet pipes, valves controlling said inlet and outlet pipes and said by-pass to divert the refrigerating agent through either the casing or by-pass, an absorption chamber in said casing between said inlet and outlet pipes, a distilling chamber communicating with said absorption chamber, a separator communicating with said distilling chamber, and means for controlling the communication between said separator and the distilling chamber.

7. In refrigerating apparatus, an absorption chamber, an expansion chamber communicating with said absorption chamber, a separator communicating with said expansion chamber, and a distilling chamber communicating with said expansion chamber.

8. In refrigerating apparatus, an absorption chamber, a distilling chamber communicating with said absorption chamber, and a separator communicating with said distilling chamber.

9. In refrigerating apparatus, an absorption chamber, a distilling chamber communicating with said absorption chamber, a separator communicating with said distilling chamber, and stop and expansion valves controlling the communication between the separator and the distilling chamber.

10. In refrigerating apparatus, a casing, inlet and outlet pipes connected with said casing, a by-pass connecting said inlet and outlet pipes, valves controlling said inlet and outlet pipes and said by-pass to divert the refrigerating agent through either the casing or by-pass, an absorption chamber in said casing between said inlet and outlet pipes, a distilling chamber in said casing below said absorption chamber, a partition in said casing between said chambers having an aperture and a channel forming communications between said chambers, a check-valve controlling said aperture in the partition and operating to close against pressure in the absorption chamber and to open to pressure in the distilling chamber, and an adjustable valve controlling the channel in the partition.

11. In refrigerating apparatus, a casing, inlet and outlet pipes connected with said casing, a by-pass connecting said inlet and outlet pipes, valves controlling said inlet and outlet pipes and said by-pass to divert the refrigerating agent through either the casing or by-pass, an absorption chamber in said casing between said inlet and outlet pipes, a distilling chamber in said casing below said absorption chamber, a partition in said casing between said chambers having an aperture and a channel forming communications between said chambers, a check-valve controlling said aperture in the partition and operating to close against pressure in the absorption chamber and to open to pressure in the distilling chamber, an adjustable valve controlling the channel in the partition, a separator communicating with said distilling chamber, and means for controlling the communication between the separator and the distilling chamber.

12. In refrigerating apparatus, a casing, inlet and outlet pipes connected with said casing, a by-pass connecting said inlet and outlet pipes, valves controlling said inlet and outlet pipes and said by-pass to divert the refrigerating agent through either the casing or by-pass, an absorption chamber in said casing between said inlet and outlet pipes, an expansion chamber in said casing below said absorption chamber, a partition in said casing between said chambers having an aperture and a channel forming communications between said chambers, a check-valve controlling said aperture in the partition to close against pressure in the absorption chamber and to open to pressure in the expansion chamber, an adjustable valve controlling the channel in the partition, a separator communicating with said expansion chamber, and means for controlling the communication between the separator and the expansion chamber.

13. In refrigerating apparatus, a cylindrical casing, an absorption chamber in said casing interposed in the circulating system, and a plurality of semicylindrical perforated cells linked together, staggeredly arranged and removably mounted in said chamber.

14. In refrigerating apparatus, a casing, inlet and outlet pipes connected with said casing, a by-pass connecting the inlet and outlet pipes, valves controlling said inlet and outlet pipes and said by-pass to divert the refrigerating agent either through the casing or through the by-pass, an absorption chamber in said casing between said inlet and outlet pipes, and cells linked together removably mounted in said chamber.

In testimony whereof I hereunto affix my signature in the presence of two witnesses.

JOHN SCHEIDEMAN.

Witnesses:
GRANT BURROUGHS,
ARTHUR L. BRYANT.